Oct. 10, 1950 J. H. GRAYSON 2,524,788
THERMOSTATIC GAS COCK
Filed Nov. 19, 1945
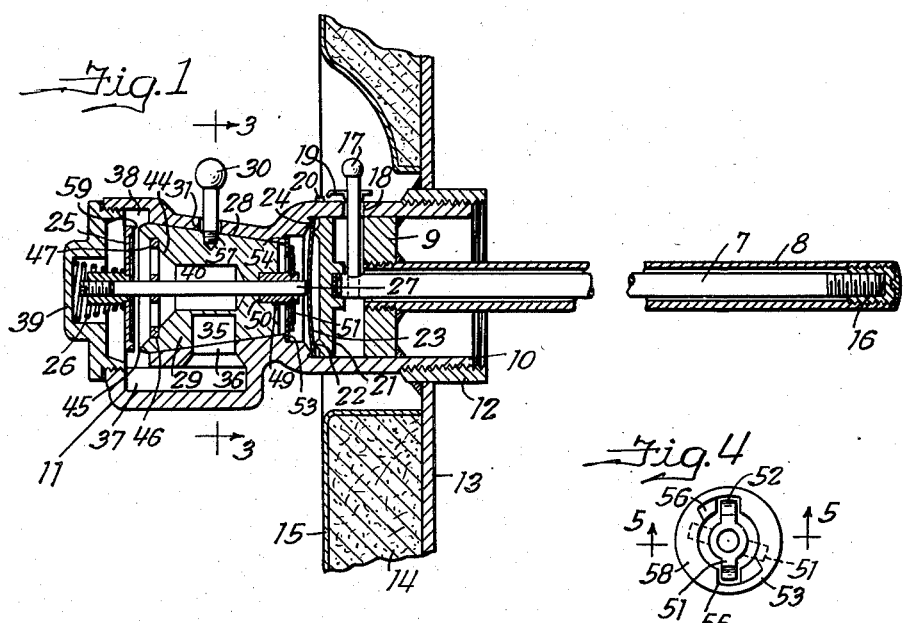
Fig.1
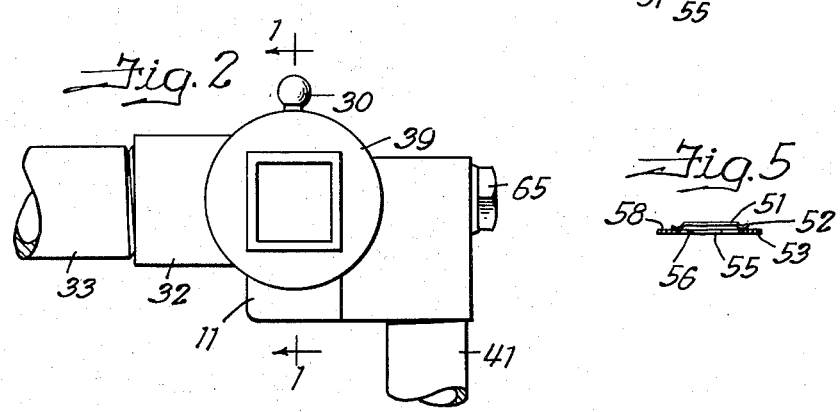
Fig.2
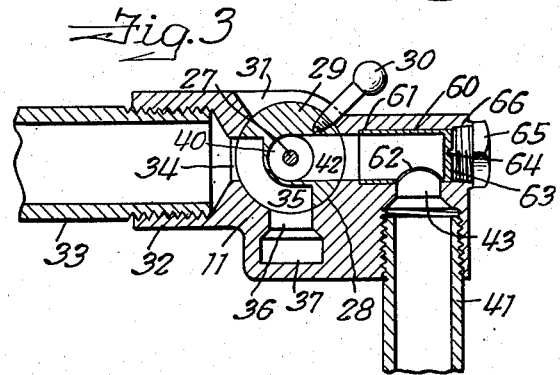
Fig.3
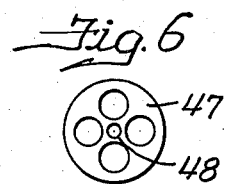
Fig.4
Fig.5
Fig.6
Inventor
John H. Grayson
Andrew F. Wintercorn
atty.

Patented Oct. 10, 1950

2,524,788

UNITED STATES PATENT OFFICE 2,524,788

THERMOSTATIC GAS COCK

John H. Grayson, Monrovia, Calif., assignor, by mesne assignments, to Reconstruction Finance Corporation, Los Angeles, Calif., a corporation of the United States Application November 19, 1945, Serial No. 629,592

2 Claims. (Cl. 236—48)

This invention relates to a new and improved thermostatic gas cock.

All thermostatically controlled gas appliances, such as water heaters, require a main gas cock for manually turning the gas on and off independently of the functioning of the thermostatic valve, and it has heretofore been the practice to provide the thermostatic valve in one body and the gas cock in another separate and distinct from the thermostatic valve. It is the principal object of my invention to combine the shut-off and thermostatic control in a single thermostatic gas cock with a view to simplicity, economy, compactness and improved performance.

Flat or disc valves are ordinarily used in thermostatic valves and require extremely accurately flat valve seats to avoid gas leakage. In the past, rolled brass valve seats, after being lapped flat, were pressed or screwed into the cast body, but it was found that despite these precautions quite a large percentage of valves leaked. This leakage I have traced to the distortion of the valve seat due to the pressing or screwing thereof into a gas-tight position. Relapping of the valve seats to correct the difficulty was impossible, because the valve seats in their assembled position are below the surface of the body casting. It is, therefore, another important object of my invention to provide the valve seat on the large end of a rotary tapered plug type valve member which is not as subject to distortion as the small bushings previously used and which, furthermore, is held in place by a yieldable spring means exerting just enough pressure to prevent gas leakage. With this arrangement, I obtain not only the elimination of a high percentage of rejections of thermostatic valves due to gas leakage but, because the rotary plug is rotatable manually to turn the gas on or off, avoid the need for a separate shut-off valve and therefore obtain the desired simplicity, economy and compactness, along with improved performance.

The invention is illustrated in the accompanying drawing, in which—

Fig. 1 is a longitudinal section through a thermostatic gas cock made in accordance with my invention, this section being taken on the line 1—1 of Fig. 2;

Fig. 2 is an end view of said cock;

Fig. 3 is a cross-section on the line 3—3 of Fig. 1;

Fig. 4 is a face view of the leaf spring for holding the plug in assembled position and the notched cam action abutment ring cooperating therewith;

Fig. 5 is a sectional detail on the line 5—5 of Fig. 4, and

Fig. 6 is a face view of the valve stem guide.

The same reference numerals are applied to corresponding parts throughout these views.

Referring to Fig. 1, the thermostat in connection with which my invention is illustrated comprises the usual elements 7 and 8, the one being non-expanding or having a low coefficient of expansion, and the other being expansible or having a comparatively high coefficient of expansion, as, for example, the movable element 7 may be a rod of Invar and the fixed element 8 may be a brass or copper tube. The tube 8 is threaded or otherwise suitably fixed in a plug 9 soldered or otherwise suitably fixed in the hollow neck 10 of a cast hollow valve body or casing 11. The neck 10 is threaded into an adapter 12 which is soldered or otherwise suitably fixed in a hole in the wall 13 of the tank of a gas-operated water heater, for example, insulation being indicated at 14 surrounding said tank and enclosed by an outer wall 15 of sheet metal. The rod 7 is adjustably secured at its outer end in the outer end of the tube 8, as by threading into a plug 16 which in turn is soldered in the end of the tube 8. By virtue of this connection, it is evident that expansion and contraction of the tube 8 results in slight endwise movement of the rod 7. It will also be evident that a temperature adjustment is obtainable by turning the rod 7 with respect to the tube 8, thus threading the rod in or out with respect to the plug 16. A lever 17 is attached to the projecting end of the rod 7 for the temperature adjustment and operates in a slot 18 in the neck 10 moving a pointer 19 relative to suitable graduations 20 on the outside of the neck 10. The rod 7, in its endwise movement, transmits movement to a plunger 21 that is slidably guided in the neck 10 and has an annular shoulder 22 in line contact in a circle on the adjacent side of a dished convexo-concave snap action disc 23, made of thin spring material such as spring bronze, although any flexible spring material suitable for the purpose may be employed. This disc 23 rests on another annular shoulder 24 of larger diameter than the shoulder 22 provided in the adjacent end of the neck 10 next to the body 11 and is normally convexed toward the plunger 21 so as to permit closing of the valve 25 under pressure of its coiled compression spring 26. However, when the tube 8 cools and contracts, moving the rod 7 to the left, pressure is exerted on the disc 23 by the plunger 21 tending to flatten it until a dead-center or flat condition is reached, whereupon the slightest additional pressure causes the disc to snap past dead-center and in so doing to open the valve 25 by operation of the push rod 27. All of the construction thus far described is old in the art and no invention is claimed therein, excepting only insofar as these details cooperate with the other details in new combinations.

In accordance with my invention, the thermostatic gas cock body 11 has an accurately machined tapered bore or seat 28 in which a tapered plug or cock 29 is rotatable with a close working gas-tight fit, the same being rotatable through 90° by means of a handle or lever 30 working in a slot 31 provided in the wall of the body 11. The body 11 has a hollow neck 32 cast integral therewith into which the gas supply pipe 33 is threaded for delivery of gas through a radial port 34 communicating with the bore 28. An arcuate passage 35 in the periphery of the plug 29 extends through 90°, as clearly indicated in Fig. 3, and in the "on" position of the plug establishes communication between the port 34 and another radial port 36 in the body 11, the latter port communicating with a longitudinal passage 37 establishing communication with a valve chamber 38 in the body 11 communicating with the large end of the bore 28 and closed by the plug 39. This plug has a central recess therein in which the large end of the conical spring 26 for closing the thermostatic valve 25 is seated. When the valve 25 is open and plug 29 is in the "on" position, it is therefore clear that gas is delivered into the axial bore 40 in the plug 29 and is conducted through an outlet pipe 41 to the burner (not shown) for heating the water in the tank 13 in the usual way. A radial port 42 is provided in the plug 29 which in the "on" position of the plug communicates with one leg of an L-shaped passage 43 provided in the body, the other leg of said passage communicating with the pipe 41. The intake end of the bore 40 is flared, as indicated at 44, toward the valve seat 45 provided on the large end of the plug 29, and there is an annular groove 46 provided in the flared portion in which a perforated valve stem guide disc 47 is inserted with a press fit. This disc has a central opening 48 receiving the stem 27 with an easy working fit. A bearing bushing 49 is pressed into a counter bore 50 in the small end of the plug 29 and receives the other end of the stem 27 with an easy working fit. A leaf spring 51 is mounted on the projecting end of the bushing 49 and has its diametrically opposed arcuately curved end portions 52 slidable on a ring 53 that has a press fit in the body 11 and is seated on an annular shoulder 54 provided in the body around the small end of the bore 28. The ring 53 is cut out at diametrically opposed points, as indicated at 55 in Fig. 4, to permit passing the arms of the leaf spring 51 through these openings in assembling the plug 29 in the bore 28, and there are inclined cam surfaces 56 provided on diametrically opposite sides of the ring 53 adjacent the openings 55 on which the curved ends 52 of the spring 51 are arranged to ride when the plug 29 is turned toward the position indicated in dotted lines in Fig. 4. The arms of the spring 51 are both flexed in riding up these inclines 56, thereby exerting the desired slight amount of spring pressure on the plug 29 in an axial direction to hold the plug in assembled position with a gas-tight fit. It is only after the plug 29 has been turned to the extent mentioned that the lever 30 may be screwed into its hole 57 in the plug 29, thus completing the assembling operation so far as the plug 29 is concerned. It is apparent in Fig. 4 that the spring 51 is free to move through 90° with respect to the ring 53 from the dotted line assembled position without riding off the flat face 58 on the ring, so that the plug 29 may be turned from the "on" to the off position. The valve seat 45 is, of course, lapped for a gas-tight fit on the lapped flat face 59 on the valve 25, and it goes without saying that the light spring pressure exerted by the spring 51 is not enough to cause any distortion of the plug and consequent distortion of the valve seat, and, therefore, the danger of gas leakage that was heretofore traceable to the distortion of the valve seat member, by reason of its being pressed or screwed in tightly, is definitely avoided. Furthermore, the fact that the valve seat member forms the shut-off cock eliminates the necessity for a separate gas cock and hence a proportionate saving in cost is realized and the general construction is simplified and rendered far more compact.

A sleeve valve 60 is inserted with a close working fit in an enlargement 61 of one leg of the L-shaped passage 43 and has a radial port 62 communicating with the other leg of said passage. One end of the valve 60 is closed, as indicated at 63, and has a screw driver slot 64 provided therein to permit turning the valve for permanently restricting the flow of gas to the burner accordingly as the gas pressure in any particular locality may require. A plug 65 closes the hole 66 in the body 11 through which access may be had to the slot 64 and serves to seal the body against gas leakage at this point. If desired, the sleeve valve 60 may be omitted and suitable provision made for variably limiting the opening movement of the plug 29, whereby to permanently restrict the flow of gas to the burner by means of the plug accordingly as the gas pressure in a particular locality may require.

In operation, the plug 29 is arranged to be turned by means of the lever 30 to "on" position when the burner of the gas appliance, such as a water heater, is to be lighted. After that, assuming the sleeve valve 60 is provided, it is adjusted accordingly as the gas pressure for the particular installation may require, so that the burner operates efficiently and with the right sized flame. The valve 25 will, of course, remain open until the water in the tank reaches a predetermined temperature, selected by the operator by adjustment of the lever 17. The valve 25 snaps to closed position and remains closed until water is drawn from the tank and the inrush of cold water lowers the temperature of the water in the tank to a predetermined extent, whereupon the valve 25 snaps open. The burner has a pilot light supplied with gas from the supply pipe 33 through the usual by-pass in the usual way. When the valve 25 is closed, the gas pressure in the line is active against the back of the valve 25 and against the large end of the plug 29, so as to assist the plug-seating spring 51 and the valve-seating spring 26 and thereby further eliminate likelihood of leakage past the valve or around the plug.

It is believed the foregoing description conveys a good understanding of the objects and advantages of my invention. The appended claims have been drawn to cover all legitimate modifications and adaptations.

I claim:

1. A valve of the character described comprising a valve body having a tapered bore, the small end of which opens into an enlarged substantially coaxial cylindrical bore, heat responsive means mounted on the latter end of said body and including a movable element guided in said cylindrical bore, a tapered plug rotatable in the tapered bore, said body having an inlet and outlet communicating with ports in said plug in the "on" position thereof, said plug being rotatable to an "off" position, a valve operating stem operable by said heat responsive means extending axially through and guided in said plug for endwise movement, said plug having a passage therein leading from one of its ports to the large end of the plug, a valve seat on said large end, a valve engageable with said seat and operable by said stem, and a leaf spring mounted on the small end of said plug and extending transversely with respect thereto and slidably engaging with spring pressure an abutment adjacent the small end of the tapered bore, whereby to hold said plug seated in said tapered bore under spring pressure, said abutment comprising a flat ring having an opening provided therein through which the end portion of said leaf spring is movable in the insertion of the plug in the tapered bore, said ring having an inclined surface thereon next to the opening up which the end portion of said leaf spring is arranged to slide upon rotation of said plug in the assembling of the valve, whereby said leaf spring is bowed and places the plug under spring pressure.

2. In a heat control, a casing having a tapered seat provided therein with which ports leading to and from passages provided in the casing communicate intermediate the ends of said seat, a tapered cut-off cock having a close working fit in said seat and having its large end protruding from the seat into a valve chamber provided in said casing with which one of the aforesaid passages communicates, the large end of said cock being provided with an accurately formed, flat, circular seat normal to the axis of rotation of said cock and spaced from the wall of said valve chamber, said cock having an axially extending passage provided therein communicating with a radial port provided in the cock adapted to register with one of the aforesaid ports in said casing, a light spring means connected to the small end of said cock to hold it seated, manually operable means connected to said cock to turn the same from one position to another, a valve push rod guided axially of said cock, an over-center snap action spring disk mounted peripherally in a fixed, spaced, coaxial relationship to the small end of said cock and abutting the adjacent end of said push rod to transmit endwise movement thereto upon snap-action of the disk, means to cause the disk to snap over center in response to a predetermined change in temperature, a valve disk in the valve chamber carried on the adjacent end of said push rod and arranged to have a close gas-tight fit on the flat seat on the large end of said cock, and a light spring means urging said valve disk toward said seat.

JOHN H. GRAYSON.

REFERENCES CITED

The following references are of record in the file of this patent:

UNITED STATES PATENTS

| Number | Name | Date |
|---|---|---|
| 1,273,837 | Ehlers | July 30, 1918 |
| 1,698,383 | Ashley | Jan. 8, 1929 |
| 1,919,265 | Vaughn | July 25, 1933 |
| 2,133,580 | Searle | Oct. 18, 1938 |
| 2,138,767 | Matthews | Nov. 29, 1938 |
| 2,302,407 | Waddell | Nov. 17, 1942 |
| 2,353,759 | Ray | July 18, 1944 |

FOREIGN PATENTS

| Number | Country | Date |
|---|---|---|
| 942 | Great Britain | 1904 |
| 55,441 | Denmark | Nov. 14, 1938 |
| 597,865 | France | Sept. 12, 1925 |